United States Patent [19]

Cleveland

[11] 4,433,934
[45] Feb. 28, 1984

[54] PUSH-PULL YOKE-POWER TAKEOFF COUPLING

[75] Inventor: Donald C. Cleveland, Rochester, Mich.

[73] Assignee: Rockwell International Corporation, Pittsburgh, Pa.

[21] Appl. No.: 409,490

[22] Filed: Aug. 19, 1982

[51] Int. Cl.³ ............................................. F16B 7/00
[52] U.S. Cl. .................................. 403/318; 403/325; 403/328
[58] Field of Search .............. 403/325, 328, 318, 316, 403/317, 322, 359, 324; 285/315, 316

[56] References Cited

U.S. PATENT DOCUMENTS 1,106,017 8/1914 Wendelken ...................... 403/328 X
3,260,541 7/1966 Sadler et al. ........................ 403/325
3,926,532 12/1975 Schlenker ....................... 403/328 X

FOREIGN PATENT DOCUMENTS 2359174 7/1975 Fed. Rep. of Germany ...... 285/316

*Primary Examiner*—Andrew V. Kundrat

[57] ABSTRACT

A push-pull collar or a yoke sleeve ramps locking pins radially outward when the collar is pushed away from a power takeoff stub shaft so that the yoke sleeve may be removed from the shaft. The pins engage detents in the ramps to hold the pins outward and to hold the collar axially inward on the yoke sleeve. Pushing the sleeve on a shaft locks the pins, releasing the collar. When the pins move inward in engagement with a shaft groove, a spring moves the collar axially outward, partially covering the pins to hold them in an inward, locked position.

5 Claims, 5 Drawing Figures

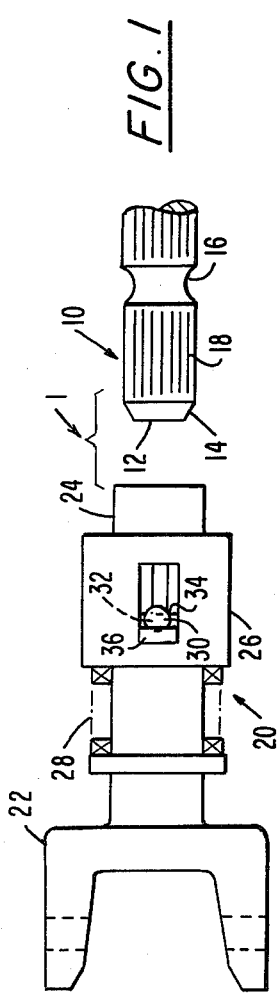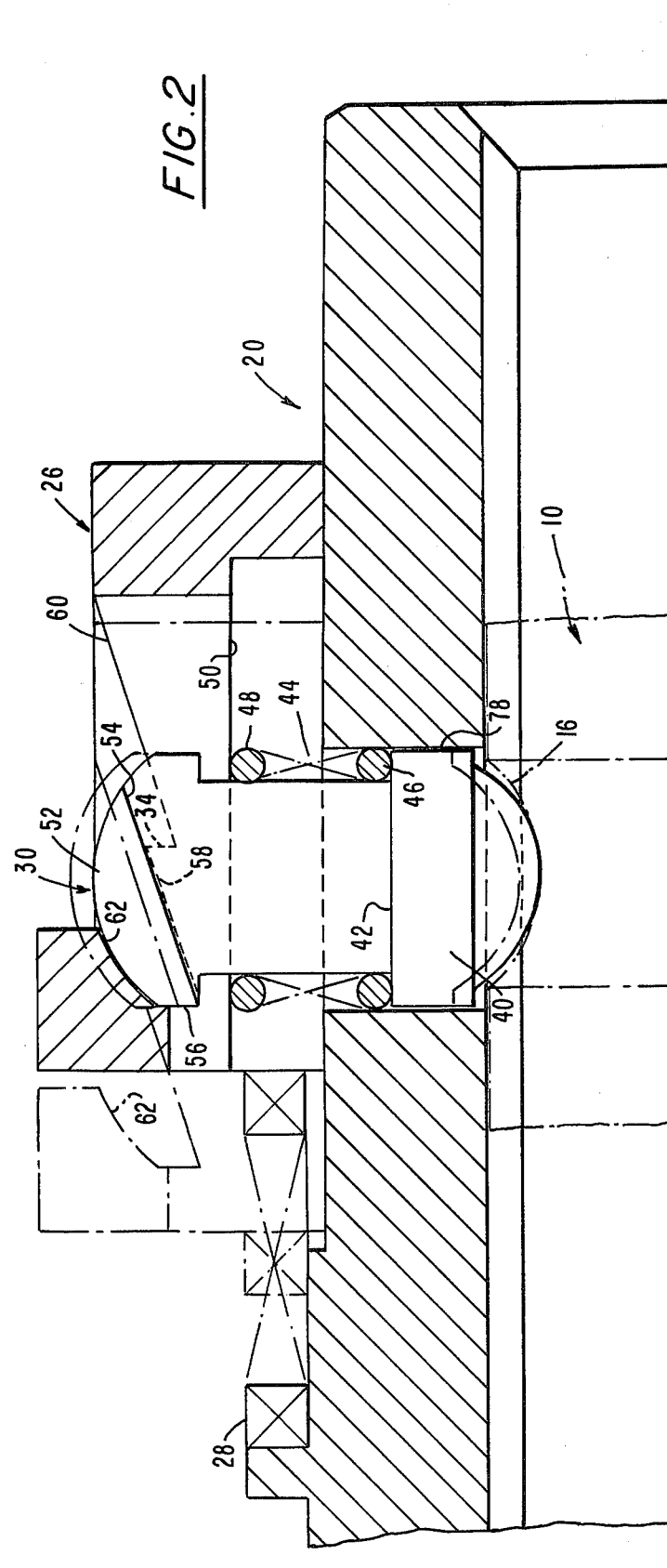

PUSH-PULL YOKE-POWER TAKEOFF COUPLING

BACKGROUND OF THE INVENTION

Field of the Invention

The invention relates to quick push-pull locking couplers for power takeoff yokes.

U.S. Pat. No. 3,926,532 shows a quick release mechanism for maintaining axial engagement in couplings. It shows a female drive member with radially movable pins that protrude into an annular groove of the male drive member. Camming surfaces surrounding the female member force the pins into the groove.

U.S. Pat. No. 3,240,519 shows a quickly detachable connection for coupled shaft sections. A spring brased dowel rod on the female member engages a groove in the male member to couple the members.

U.S. Pat. No. 3,827,816 shows a coupling device that uses a cam ring to force pins enclosed in the female member to engage a groove on the power takeoff shaft to be coupled.

U.S. Pat. No. 3,822,951 shows a drive shaft knuckle coupler that uses protruding detents that lock into an annular groove in a power takeoff shaft. A cam ring permits exit of the detents from the bore to release the shaft.

U.S. Pat. No. 3,260,541 shows a coupler for a power takeoff shaft which lends itself to easy and rapid mounting and demounting from the power takeoff shafts. Three balls embedded within the coupler engage a groove in the power takeoff shaft.

U.S. Pat. Nos. 2,672,924, 3,302,960, 3,747,966 and 3,764,153 show a cross-section of the state-of-the-art in quick release couplings for power takeoff shafts.

A need exists for power takeoff connections which have quick on and off one hand operation and which provide automatic positive locking.

SUMMARY OF THE INVENTION

The invention provides means for locking and disengaging shaft couplings particularly power takeoff and yoke sleeve couplings. A spring-biased collar on the yoke sleeve is pushed away from a shaft power takeoff stub shaft to lift locking pins from locking engagement in a shaft groove to separate the coupling. The locking pins hold the collar locked against spring pressure until the sleeve is inserted in a shaft. Then the pins are further lifted, releasing the collar to release and lock the pins.

A push-pull collar or a yoke sleeve ramps locking pins radially outward when the collar is pushed away from a power takeoff stub shaft so that the yoke sleeve may be removed from the shaft. The pins engage detents in the ramps to hold the pins outward and to hold the collar axially inward on the yoke sleeve. Pushing the sleeve on a shaft locks the pins, releasing the collar. When the pins move inward in engagement with a shaft groove, a spring moves the collar axially outward, partially covering the pins to hold them in an inward, locked position.

This invention provides a new shaft coupling locking apparatus. A power takeoff stub shaft has power transmission features, which may be splints or a non-round configuration. The shaft has a first end with a beveled edge. A detent-receiving groove or depression is spaced axially inward from the first end.

A shaft sleeve has an axial opening for receiving the shaft. The shaft sleeve has complementary longitudinal power transmission features for cooperating with power transmission features of the shaft to prevent relative rotation and to provide rotary power transmission between the shaft and the sleeve. The sleeve has an opening extending through a wall. A pin slides in the opening. A collar is positioned on the sleeve and slides axially thereon. The collar has a clamp for holding the pin inward in the sleeve in contact with the detent-receiving groove in the shaft for locking the shaft in the sleeve. The collar has moving means cooperating with pin for moving the pin outward with respect to the sleeve for disengaging the pin from the detent-receiving groove in the shaft.

In a preferred embodiment the pin has an outer head with a first ramp, and the moving means is second ramp in the collar for cooperating with the first ramp means to move the pin outward with respect to the sleeve.

Preferably the first and second ramps slope upward and outward in a direction of an end of the sleeve in which the shaft is received. Moving the collar away from the end of the sleeve moves the second ramp axially, thereby moving the first ramp and the pin outward with respect to the sleeve.

In one preferred embodiment the collar has a retaining clamp and an end of the collar remote from the shaft-receiving end of the sleeve. The retaining clamp cooperates with the pin to hold the pin inward.

In a preferred embodiment the pin has a head in an inward end. A spring surrounds the pin. A first end of the pin spring bears against the inward head of the pin. The collar has a ledge spaced outward from the sleeve. A second end of the pin-surrounding spring bears against the collar ledge for urging the spring inward into locking contact with the detent receiving groove on the shaft.

In the preferred embodiment a collar return spring is mounted externally on the sleeve between a radial extension on the sleeve and the collar for urging the collar in the direction of the shaft receiving end, thereby engaging the pin in the retainer clamp on the collar for holding the pin inward in shaft-locking position.

Preferably, the sleeve has plural holes extending through its wall and plural pins with plural pin-surrounding springs. The collar has plural pin receivers, each pin receiver having a second ramp, a pin retainer clamp and a pin spring engaging ledge.

In the preferred embodiment, the pins have first ramps on opposite sides for cooperating with second ramps on opposite sides of the pin receiving openings in the sleeve. Preferably the second sleeve ramps are stepped to form detents for holding the pin outward.

Pulling the locking collar in a direction away from the tractor stub shaft causes the collar to slide along the hub of the yoke sleeve compressing a heavy spring and causing the pin to ride up the ramp of the collar. The pin rises to the top of the ramp at which position the pin is fully disengaged from the groove in the tractor stub shaft allowing the yoke sleeve to slide free of the tractor stub shaft, locking the pin head in the upper portion of the ramp, and holding the pin in the upward position. Pushing the yoke onto the tractor stub shaft causes the tractor stub to strike the inward end of the pin, causing the pin to rise until it goes up and over the point of the lower ramp, the locking collar is slid under the head of the pin and pin slides down onto the lower ramp causing the inward end to engage the groove in the tractor stub shaft.

One object of the invention is to provide a new improved self-actuating power takeoff yoke coupling.

Another object of the invention is to provide a shaft sleeve locking coupling which requires a single axial movement of a collar for unlocking.

Another object of the invention is to provide an automatic self-cocking locking collar for a shaft sleeve coupling.

These and other further objects and features of the invention are apparent in the specifications, claims and drawings.

BRIEF DESCRIPTION OF THE DRAWINGS

FIG. 1 is a schematic representation of the coupling.

FIG. 2 is a schematic representation of operation of the sleeve, collar and one pin.

DETAILED DESCRIPTION OF THE PREFERRED EMBODIMENTS

Figure 3:
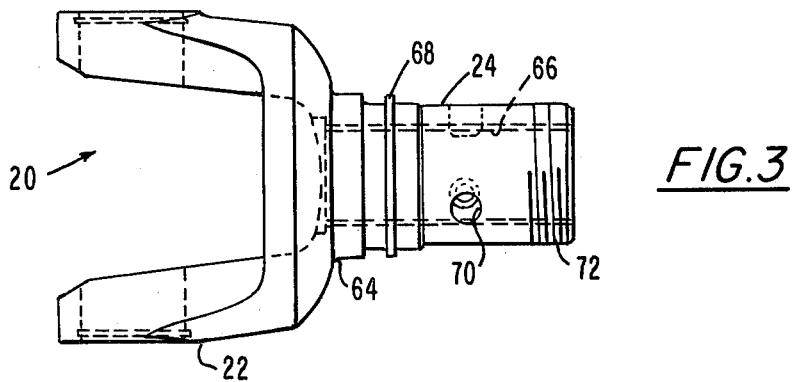
FIG. 3 is a detail of the yoke sleeve.

Referring to the drawings, a coupling is generally referred to by the numeral 1. A power takeoff stub shaft 10 has a first end 12 with a bevelled edge 14 and a detent-receiving locking groove 16 interrupting splines 18.

A yoke sleeve assembly 20 fits on shaft 10. Yoke 22 has a sleeve 24 at one end. Collar 26 slides on sleeve 24 against the force of return spring 28. Sliding collar 26 to the left raises pin 30 on ramp 32, lifting the pin from locking groove 16 of shaft 10. The leftward motion on collar 26 tends to push yoke 20 away from shaft 10. As the collar is moved to the left and as pin 30 is raised by ramp 32 the head of pin 30 engages a detent 34 which holds the pin outward and which holds the collar cocked to the left against the force or return spring 28.

When the yoke is pushed on shaft 10, bevelled edge 14 lifts the pin 30 releasing detent 34 and allowing spring 28 to move collar 26 to the right. When pin 30 is pushed into groove 16 by a pin-surrounding compression spring, spring 28 pushes collar 26 further to the right, capturing the head of pin 30 beneath locking element 36. The pin remains locked in the groove until an intentional movement of collar 26 to the left against spring 28 displaces the locking element from the pin and lifts the pin.

In FIG. 2 pin 30 and collar 26 are shown in downward and a locked positions. Phantom lines show the pin 30 in partially raised position engaging detent 34 in ramp 32 holding collar 26 cocked to the left, again and compressing spring 28.

Pin 30 has a rounded inner end 40 which fits in depression 16 in shaft 10. End 40 has a ledge 42 for receiving one end 46 of spring 44. The outer end 48 of the spring 12 slides on inward facing ledge 50 of collar 26. The upper end of pin 30 has a head 52, which has an inward facing cam surface 54 and an edge 56.

Cam 54 rides on ramp 32 to move pin 30 outward. When collar 26 is moved to the left, cam 54 rides on the first part 58 of ramp 32. The pin is moved inward by spring 44 as edge 56 passes detent 34. Further movement of the collar to the left lifts cam 54 along part 60 of ramp 32 so that inner end 40 of pin 30 clears the groove 16 in shaft 10. When collar 26 is released heavy spring 28 returns the collar to the right until pin edge 56 abuts detent 34 as shown in phantom lines.

When coupling sleeve 20 with shaft 10, bevelled edge 14 lifts rounded inner end 40 of pin 30, releasing detent 34. End 40 rides upon shaft 10 until it reaches groove 16. As end 40 drops into groove 16, cam 32 permits ramp 54 to move to the right until locking recess 62 engages head 52 and holds pin 32 in the inward, locked position.

As shown in FIG. 3 yoke sleeve assembly 20 has a yoke 22 joined at its throat 64 to a cylindrical sleeve 24 with inner splines 66. A radial extension 68 anchors one end of heavy spring 28. Three holes 70 are evenly spaced on sleeve 24 to receive three pins 30. External threads 72 receive a threaded collar retainer (not shown).

Figure 4:
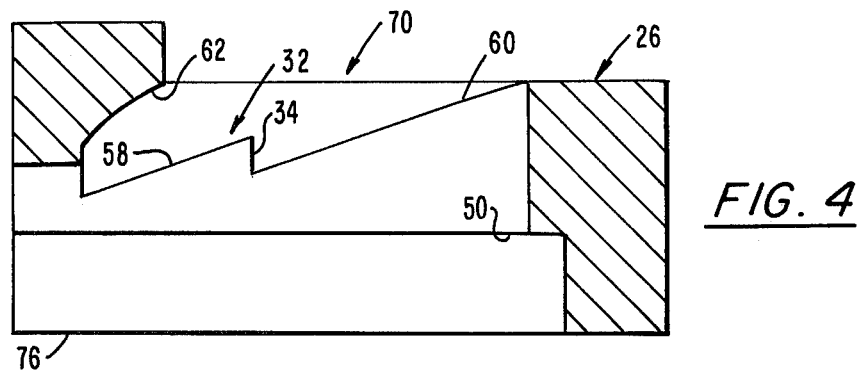
FIG. 4 is a detail of the collar 1.

Collar 26 shown in FIG. 4 has three uniformally spaced pin receiving aperatures 74. Each has parallel spaced ramps 32 with first parts 58 and second parts 60 separated by radial detents 34. An inner cylindrical surface 76 slides on an outer surface of sleeve 24.

Each aperture 74 has a ledge 50 against which pin spring 44 bears. Locking recesses 62 cooperate with heads 52 of pins 30.

Figure 5:
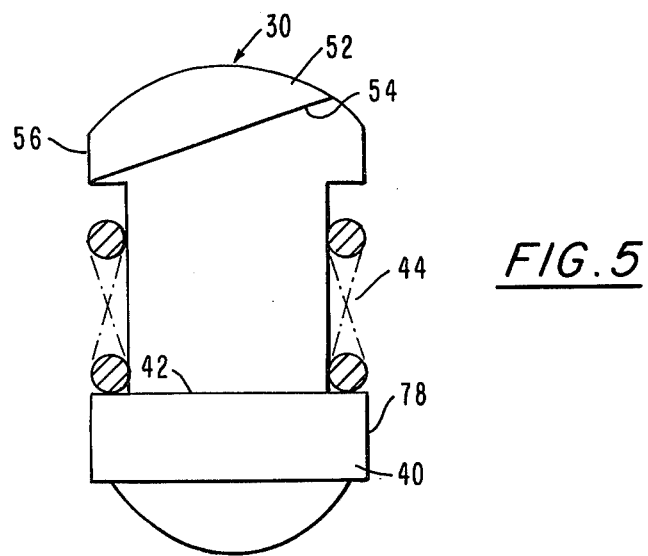
FIG. 5 is a detail of the pin and pin spring.

As shown in FIG. 5 each pin 30 is surrounded by a light compression spring 44 which acts against surface 42 and ledge 50 to urge pins 30 inward. Cylindrical surfaces 78 guide pins 30 in sleeve holes 70.

Yoke sleeve assembly 20 is assembled by placing spring 28 on the sleeve. Pins 30 are placed in holes 70, and collar 26 is positioned over holes 70, and the pins are pressed outward so that heads 52 pass between ramps 32. Alternatively heads 52 may be eliptical and pins 30 may be turned 90 degrees to align cam 54 with ramps 32.

Alternately, heads 52 may be enlarged in situ after assembly.

The collar 26 allows a hand push-pull assembly and disassembly while providing positive, automatic shaft-sleeve locking and unlocking. Pulling the locking collar in a direction away from the tractor causes the collar to slide along the sleeve 24 the yoke assembly 20 compressing the heavy spring 28 and causing the pin to ride up the ramp 32 of the collar. The pin rises to the top of the ramp at which position the pin is fully disengaged from the groove 16 in the tractor stub shaft 10, allowing the power takeoff shaft to slide free of the tractor shaft and locking the pin head in the upper portion of the ramp and holding the pin in the "up" position.

Pushing the yoke assembly 20 onto the tractor stub shaft 10 causes the tractor stub to strike the bottom or point end 40 of the pin 30, causing it to rise until it goes up and over the point 34 of the lower ramp 58 the locking collar 26 is slid under the head 52 of the pin 30 and pin slides down into the lower ramp, causing the point end 40 to engage with the groove 16 in the tractor shaft 10.

Thus is to provided means of locking a power takeoff shaft to a tractor stub shaft or disengaging the power takeoff shaft from the tractor by simple push or pull action.

While the invention has been described with reference to a preferred embodiment, modifications and variations can be constructed without departing from the scope of the invention, which is defined in the following claims.

I claim:

1. A shaft coupling locking apparatus comprising a first shaft having longitudinal power transmission features and having a first end with a beveled edge and having a detent receiving means spaced axially from the first end, a shaft sleeve having an axial opening for receiving the shaft, the shaft sleeve having complementary longitudinal power transmission features for cooperating with power transmission features of the shaft to prevent relative rotation and to provide rotary power transmission between the shaft and the sleeve, the sleeve having an opening extending therethrough and having a pin slideable in the opening, collar means positioned on the sleeve and slideably axially thereon, the collar means having clamping means for holding the pin inward in the sleeve in contact with the detent receiving means in the shaft for locking the shaft in the sleeve, and the collar having moving means cooperating with the pin for moving the pin outward with respect to the sleeve for disengaging the pin from the detent receiving means in the shaft, said pin has an outer head with first ramp means and wherein the moving means comprises second ramp means in the collar for cooperating with the first ramp means to move the pin outward with respect to the sleeve, said first and second ramp means slope upward and outward in a direction of an end of the sleeve in which the shaft is received, whereby moving the collar away from that end of the sleeve moves the second ramp means axially, thereby moving the first ramp means in the pin outward with respect to the sleeve.

2. The apparatus of claim 1 wherein the collar has retaining means at an end thereof remote from the shaft receiving end of the sleeve and wherein the retaining means cooperates with the pin to hold the pin inward.

3. The apparatus of claim 2 wherein the pin comprises a head on an inward end of the pin and further comprising a spring surrounding the pin and having a first end bearing against the inward head of the pin, the collar having a ledge spaced outward from the sleeve, and a second end of the pin surrounding spring bearing against the collar ledge for urging the spring inward into locking content with the detent receiving means on the shaft.

4. The apparatus of claim 3 further comprising a collar return spring mounted externally on the sleeve between a radial extension on the sleeve and the collar for urging the collar in the direction of the shaft receiving end and thereby engaging the pin in the retainer on the collar for holding the pin inward in shaft locking position.

5. The apparatus of claim 4 wherein the sleeve has plural holes extending therethrough and further comprising plural pins with plural pin surrounding springs and wherein the collar has plural pin receivers, each having second ramp means, a pin retainer and a pin spring engaging ledge.

* * * * *